United States Patent Office 3,524,884
Patented Aug. 18, 1970

3,524,884
INTRAMOLECULAR CYCLIZATION OF CIS-4-CYCLOOCTENE-1-CARBOXYLIC ACID CHLORIDE TO FORM BICYCLO[3.3.1]NONYL COMPOUNDS
Herbert C. Kretschmar, Greenhills, Ohio, assignor to The Procter & Gamble Company, Cincinnati, Ohio, a corporation of Ohio
No Drawing. Filed Nov. 28, 1966, Ser. No. 597,226
Int. Cl. C07c 45/00, 49/00
U.S. Cl. 260—586                 9 Claims

ABSTRACT OF THE DISCLOSURE

The intramolecular cyclization of cis-4-cyclooctene-1-carboxylic acid chloride to form bicyclo[3.3.1]nonyl compounds is disclosed. The bicyclo[3.3.1]nonyl compounds are useful in perfume and flavor compositions.

---

This invention relates to the intramolecular cyclization of vis-4-cyclooctene-1-carboxylic acid chloride to form bicyclo[3.3.1]nonyl compounds. More specifically, it has been discovered that cis-4-cyclooctene-1- carboxylic acid chloride can be intramolecularly cyclized to form bicyclo-[3.3.1]non-2-en-9-one, 2-exo-chlorobicyclo[3.3.1]nonan-9-one, and 2-endochlorobicyclo[3.3.1]nonan-9-one.

Bicyclo[3.3.1]non-2-en-9-one has a desirable green comphoraceous musty-woody odor and is useful as an odorant. Significantly, bicyclo[3.3.1]non-2-en-9-one is a starting material for the synthesis of novel β,γ-unsaturated bicyclic-cyclobutanones as described in the copending U.S. patent application of Herbert C. Kretschmar, Ser. No. 566,861, filed June 13, 1966. Heretofore, the preparation of bicyclo[3.3.1]non-2-en-9-one involved either a multi-step, low yield (approximately 5–10%) procedure starting with cyclohexenone [Tetrahedron 20, 215 (1964)] or a high pressure reaction (40–50% yield) of cyclooctadiene with carbon monoxide in the presence of expensive palladium catalysts [Chemical Communications #1, 6 (1966)].

The present invention provides a novel, simple and economical process for preparing bicyclo[3.3.1]non-2-en-9-one in 40–60% yield from cis-4-cyclooctene-1-carboxylic acid chloride, a readily preparable starting material.

2 - exo - chlorobicyclo[3.3.1]nonan-9-one and 2-endo-chlorobicyclo[3.3.1]nonan-9-one are novel compounds possessing unique and useful olfactory and flavor characteristics as described in detail hereinafter.

The present invention provides a novel, simple and economical process for preparing 2-exo-chlorobicyclo [3.3.1] - nonan-9-one and 2 - endo-chlorobicyclo[3.3.1] nonan-9-one.

Accordingly, it is an object of this invention to provide the novel intramolecular cyclization reaction of cis-4-cyclooctene-1-carboxylic acid chloride to form bicyclo-[3.3.1]nonyl compounds.

It is another object of this invention to provide a process for preparing bicyclo[3.3.1]nonyl compounds selected from the group consisting of bicyclo[3.3.1]non-2-en-9-one, 2-exo-chlorobicyclo[3.3.1]nonan-9-one, 2-endo-chlorobicyclo[3.3.1]nonan-9-one, and mixtures thereof.

It is a further object of this invention to provide the novel compounds 2-exo-chlorbicyclo[3.3.1]nonan - 9-one and 2-endo-chlorobicyclo[3.3.1]nonan-9-one.

Further objects of this invention relating to the perfume and flavor arts will be apparent herein.

The above and other objects are achieved by the novel intramolecular cyclization process which comprises: heating cis-4-cyclooctene-1-carboxylic acid chloride to form bicyclo[3.3.1]non-2-en-9-one, 2-exo-chlorobicyclo[3.3.1]-nonan-9-one, and 2-endo - chlorobicyclo[3.3.1]nonan-9-one. In the preceding expression, the term "heating" means the application of a temperature greater than room temperature, e.g., a temperature greater than about 25° C.

Cis-4-cyclooctene-1-carboxylic acid chloride, the starting material for the reaction of this invention, can be readily prepared from the corresponding cis-4-cyclooctene-1-carboxylic acid. This acid can also be easily prepared in three steps from the commercially available material cyclooctadiene according to the method of K. Ziegler and H. Wilms as disclosed in Ann. 567, 1 (1950). In essence, the method of Ziegler and Wilms involves monohydrobromination of the cyclooctadiene followed by Grignard reagent formation and carboxylation. The cyclooctene-1-carboxylic acid thus produced can be converted to cis-4-cyclooctene-1-carboxylic acid chloride in 90% yield by reaction with oxalyl chloride at room temperature.

The following is a schematic representation of the reaction of the present invention:

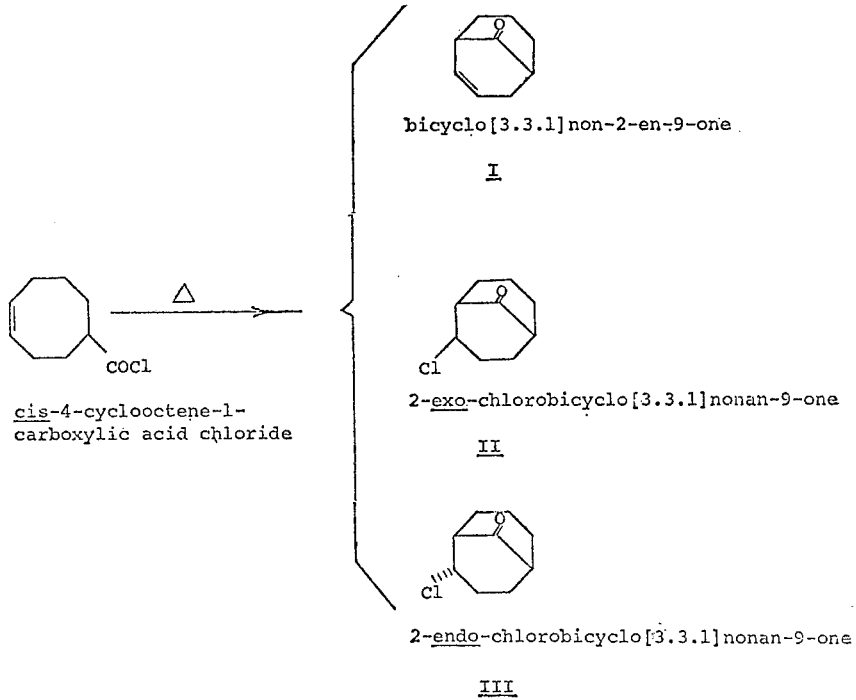

As indicated in the schematic illustration, each of the products, bicyclo[3.3.1]non-2-en-9-one (I), 2-exo-chlorobicyclo[3.3.1]-nonan-9-one (II), and 2-endo-chlorobicyclo[3.3.1]nonan-9-one (III), are formed from this invention's intramolecular cyclization of cis-4-cyclooctene-1-carboxylic acid chloride. It is surprising and unexpected that the bicyclo[3.3.1]nonyl structure can be formed from an open ring compound in one step under the mild conditions set forth herein.

The specific conditions under which the reaction of the invention is carried out determine the relative proportion of the products, I, II, and III. When it is so desired, I can be obtained in 40%–60% yield as the dominant product. Yield values herein are based on the theoretical conversion of cis-4-cyclooctene-1-carboxylic acid chloride to the subject product. The particular embodiment of the invention wherein I is the dominant product is hereinafter referred to as "Reaction I." When it is so desired, II can be obtained in 30%–60% yield as the dominant product; this embodiment of the invention wherein II is the dominant product is hereinafter referred to as "Reaction II." When it is so desired, III can be obtained in 20%–40% yield as the dominant product; this specific embodiment of the invention wherein III is the dominant product is hereinafter referred to as "Reaction III."

REACTION I

Reaction I is characterized by the fact that a low concentration of cis-4-cycloctene-1-carboxylic acid chloride in a solvent, preferably in a polar solvent, is heated in the presence of a Lewis acid catalyst, whereby I is formed in 40%–60% yield as the dominant product. Reaction I also results in the formation of II and III in yields of 1%–3% and 15%–20% respectively.

Desirable solvents for Reaction I are those which dissolve the reacting materials to form a homogeneous system but are otherwise inert and do not interfere with the reaction.

A polar solvent is preferably used in conjunction with Reaction I. Examples of preferred polar solvents are ethers, preferably of from 4 to 10 carbon atoms, most preferably cyclic monoxy ethers such as tetrahydrofuran, cyclic dioxy ethers such as dioxane, and aliphatic dioxy ethers such as ethylene glycol dimethyl ether or diethylene glycol dimethyl ether.

Ethylene glycol dimethyl ether and diethylene glycol dimethyl ether are highly preferred polar solvents for use with Reaction I.

Non-polar solvents can also be used for Reaction I with satisfactory results. For instance, saturated hydrocarbons constitute a class of useful non-polar solvents for Reaction I. Examples of saturated hydrocarbon solvents include the alkanes, preferably of from 5 to 12 carbon atoms, e.g., pentane, n-heptane, octane, and dodecane; and the cycloalkanes, preferably of from 5 to 8 carbon atoms, e.g., cyclopentane, cycloheptane, and cyclooctane.

Additional useful non-polar solvents for Reaction I include: aromatic hydrocarbons, preferably of from about 6 to 9 carbon atoms, e.g., benzene, toluene and xylene; and halogenated hydrocarbons, preferably of from 1 to 10 carbon atoms, e.g., ethylene dichloride and tetrachloroethylene.

Reaction I is carried out in the presence of a Lewis acid catalyst. Examples of suitable Lewis acid catalysts are: borontrifluoride, aluminum chloride, ferric chloride, stannic chloride, stannous chloride, and the like. Further examples of Lewis acid catalysts are found in Chapter II, vol. I of Olah, Friedel Crafts and Related Reactions, Interscience Publishers, 1963. Borontrifluoride and aluminum chloride are preferred Lewis acid catalysts for use herein. Borontrifluoride as its etherate complex is highly preferred.

The concentration of cis-4-cyloocetene-1-carboxylic acid chloride in the solvent should be low, e.g., within the range of from about 0.1% to about 20%, preferably within the range of from about 5% to about 10% (percentage herein are by weight unless noted otherwise). A concentration of cis-4-cycloocetene-1-carboxylic acid chloride in the solvent of greater than about 20% tends to give the results described hereinafter under "Reaction III."

The concentration of the Lewis acid catalyst in the solvent should be within the range of from about 0.1% to about 20%, preferably within the range of from about 1% to about 5%.

The temperature of Reaction I can range from about 30° C. up to the boiling point of the solvent. Preferably, the temperature is maintained within the range of from about 70° C. to about 110° C. It is desirable to carry out the reaction in the presence of an inert gas such as nitrogen, argon or the like.

The time for Reaction I to reach completion is dependent upon such variables as the specific solvent used, the concentration of cis-4-cyclooctene-1-carboxylic acid chloride in the solvent, the specific Lewis acid catalyst used, the concentration of the Lewis acid catalyst in the solvent, and the like. Generally, however, the reaction is complete within a time ranging from about 30 minutes to about 120 hours, more generally, within from about 24 hours to about 90 hours.

After Reaction I is complete, the products I, II, and III, can be separated from the reaction mixture and from each other by gas-liquid chromatography. However, in order to insure that the optimum yield of I is obtained, it is preferable to observe the following separation and purification procedure: The reaction mixture is allowed to cool to room temperature, e.g., 25° C., and then water is added to deactivate the Lewis acid catalyst. It is desirable to use at least one mole of water per mole of Lewis acid catalyst present in the reaction system; a large excess of water is preferable. The mixture is then extracted with ether. The ether extracts are washed, dried, and evaporated, leaving the products I, II, and III as a liquid residue. This residue can be distilled to afford I, II and III which can be further isolated by chromatography. Preferably, however, the residue is dissolved in an excess of 10% potassium hydroxide in alcohol and the mixture thus formed is heated at reflux (64°–65° C.) for 1–5 hours. This treatment causes III to form the potassium salt of cis-4-cyclooctene-1-carboxylic acid and causes II to form I, thereby increasing the yield, and facilitating the subsequent separation, of I. The reaction mixture is again allowed to cool to room temperature and I can then be separated and purified by conventional extraction, distillation, and recrystallization techniques. More specific details on this procedure are found in Example I, infra.

REACTION II

Reaction II is characterized by the fact that a high concentration of cis-4-cyclooctene-1-carboxylic acid chloride in a solvent, preferably in a non-polar solvent, is heated in the absence of a Lewis acid catalyst, whereby II is formed in 30%–60% yield as the dominant product. Reaction II also results in the formation of I and III in yields of 5%–10% and 20%–30% respectively.

Any of the solvents specified hereinbefore under Reaction I can be used in conjunction with Reaction II. However, the nonpolar solvents, e.g., saturated hydrocarbons, aromatic hydrocarbons, and halogenated hydrocarbons, are preferred. Benzene and ethylene dichloride are highly preferred solvents for this reaction. Lewis acid catalysts are not included in the reaction system for Reaction II.

For Reaction II, the concentration of cis-4-cyclooctene-1-carboxylic acid chloride in the solvent should be high, e.g., within the range of from about 30% to about 90%, more preferably within the range of from about 40% to about 80%.

The temperature of Reaction II can range from about 30° C. up to the boiling point of the solvent. Preferably, the temperature is maintained within the range of from about 70° C. to about 110° C. An inert atmosphere for Reaction II is desirable.

Reaction II generally takes longer to complete than does Reaction I. Generally, Reaction II will reach completion within a time ranging from about 10 hours to about 200 hours, more generally, within a time ranging from about 50 hours to 100 hours.

After reaction II is complete, the products, I, II, and III, can be separated from the reaction mixture and from each other by gas-liquid chromatography. However, in order to insure that the optimum yield of II is obtained, it is preferably to observe the following separation and purification procedure: The reaction mixture diluted with an excess of warm water and then allowed to cool to room temperature whereupon an excess of 10% sodium hydroxide solution is added. The resulting mixture is then extracted with ether. The ether extracts are washed with water, dried, and evaporated leaving the products I, II, and III as a liquid residue. The liquid residue is then combined with a slight excess of a solution of potassium tertiary-butyl alcoholate in tertiary-butyl alcohol and allowed to stand for several hours at room temperature in an inert atmosphere. This treatment causes III to form the potassium salt of cis-4-cyclooctene-1-carboxylic acid, thus facilitating separation of II. II can then be separated and purified by convention extraction and recrystallization techniques. More specific details on this procedure are found in Example II, infra.

REACTION III

Reaction III is characterized by the fact that a moderate concentration of cis-4-cyclooctene-1-carboxylic acid chloride in a solvent, preferably a polar solvent, is heated in the presence of aluminum chloride as a Lewis acid catalyst, whereby III is formed in 20%–40% yield as the dominant product. Reaction III also results in the formation of I and II in yields of 20%–35% and 10%–15% respectively.

For reaction III, the concentration of cis-4-cyclooctene-1-carboxylic acid chloride in the solvent should be moderate, e.g., within the range of from about 20% to about 80%, preferably within the range of from about 30%–50%. A concentration of cis-4-cyclooctene-1-carboxylic acid chloride in the solvent of less than about 20% tends to give the results described hereinbefore under "Reaction I." The other conditions for Reaction III; e.g., type of solvent, Lewis acid catalyst (aluminum chloride for Reaction III) and its concentration, temperature, and inert atmosphere, are all identical to those set forth hereinbefore for Reaction I. The time for Reaction III to reach completion is generally between about 30 minutes and 90 hours, more generally, between about 4 hours and 24 hours.

After Reaction III is complete, the products I, III, and III, can be separated from the reaction mixture and from each other by gas-liquid chromatography. However, in order to insure that the optimum yield of III is obtained, it is preferable to follow the following separation and purification procedure: The reaction is allowed to cool to room temperature and then water is added to deactivate the aluminum chloride catalyst. It is preferable to use at least one mole of water per mole of Lewis acid catalyst present in the reaction system. The mixture is then extracted with ether. The ether extracts are combined, washed, dried, and evaporated. III can then be separated from the remaining reaction mixture by gas-liquid chromatography and purified by preparative gas-liquid chromatography. More specific details on this procedure are found in Example III, infra.

As mentioned hereinbefore, the compounds prepared by the novel intramolecular cyclization reaction of this invention, I, II, and III, all have highly desirable and useful olfactory characteristics. I has a green camphoraceous musty-woody odor as mentioned hereinbefore. II and III each have an odor defined as a grassy-weedy camphoraceous note with a musty-woody background.

I, II, and III can be used individually or in admixture with each other as odorants per se or as components of perfume compositions for ultimate use in products such as soaps, detergents, and the like. Perfume compositions containing odoriferously effective amounts, e.g., from about 0.0001% to about 50%, of I, II, III, or mixtures thereof, are desirable and useful. These compounds find particular utility in woody-lavender type perfume compositions which are especially suitable for use with soap and detergent compositions, e.g., the detergent compositions disclosed in U.S. Pats. 3,159,581 and 3,213,030. More specific illustrations of the perfume utility of I, II, and III are found in Examples IV, V and VI, infra.

Also as mentioned hereinbefore, II and III have unique and useful flavor characteristics in addition to their odorant utility. II and III each have a flavor defined as cheesy ketone with a lactone-like coconut background. These compounds can be used per se or as components of flavor compositions for ultimate use in products such as butter, margarine, cheese, or similar dairy-flavored products. Cheese-flavor formulations, particularly of the blue-cheese type, containing effective amounts, e.g., 0.0001% to 50%, of II and/or III are desirable and useful. It has been discovered that the addition of II and/or III to cheese-flavor formulations causes a general enhancement of the fullness and cheese flavor character of such formulations. For example, cheese-flavor formulations of the type described in Food Flavorings, Merory, Avi Publishing (1960), pages 168 and 169, can be enhanced by the addition of II and/or III. More specific illustration of the flavor utility of II and III is found in Example VII, infra.

EXAMPLE I

Reaction I

A solution of 50.0 g. (0.29 mole) of cis-4-cyclooctene-1-carboxylic acid chloride and 50 ml. of boron trifluoride etherate (~24.5 grams of boron trifluoride) in 1 liter of ethylene glycol dimethyl ether [1] was heated at 100° C. under a nitrogen atmosphere for 72 hours. The reaction mixture was then cooled to 25° C.

100 ml. of water was added dropwise to the reaction mixture prepared above to destroy the boron trifluoride etherate. The reaction mixture was then poured into 2 liters of water and stirred for 1 hour. The resulting brown liquid was extracted with four 200 ml. portions of ether. The ether layers were combined, washed with water, dried and evaporated to give 32.0 g. of a brown liquid residue.[2] This liquid was dissolved in 200 ml. of 10% potassium hydroxide in alcohol and heated at reflux (64°–65° C.) for 3 hours. The mixture thus obtained was diluted with 200 ml. of water and extracted with three 100 ml. portions of ether. The etheral extracts were combined, washed with water, dried, and the ether evaporated to give 21.2 g. (53% yield) of bicyclo[3.3.1]non-2-en-9-one I as a yellow solid, M.P. 90–96° C., having a green camphoraceous musty-woody odor. Sublimation of this product at 70° C. (25 mm.) raised the M.P. to 95°–98° C. Identification of the product was further confirmed by n.m.r. and infrared spectral properties and g.l.c. retention time.

---
[1] This represents a percent by weight concentration in the solvent of 5.74% and 2.7%, respectively, for cis-4-cyclooctene-1-carboxylic acid chloride and boron trifluoride etherate (on an active boron trifluoride basis).

[2] In separate experiments, distillation of this brown liquid residue afforded I in 40%–60% yield, II in 1%–3% yield, and III in 15%–20% yield. Each of the products I, II and III can be isolated by gas chromatography at this point. However, to insure optimum yield of I, the procedure as outlined in the example is preferably followed.

In this example, substantially equivalent results are obtained in that I is formed as the dominant product when the borontrifluoride etherate is replaced on an equivalent weight basis with a Lewis acid catalyst selected from the group consisting of aluminum chloride, ferric chloride, stannic chloride and stannous chloride.

Also in this example, substantially equivalent results are obtained in that I is formed as the dominant product when the ethylene glycol dimethyl ether is replaced by another solvent selected from the following: An ether of from 4 to 10 carbon atoms, e.g., tetrahydrofuran, dioxane, or diethylene glycol dimethyl ether; a saturated hydrocarbon such as an alkane of from 5 to 12 carbon atoms, e.g., pentane, n-heptane, octane and dodecane, or a cycloalkane of from 5 to 8 carbon atoms, e.g., cyclopentane, cycloheptane, and cyclooctance; an aromatic hydrocarbon of from 1 to 10 carbon atoms, e.g., benzene, toluene, and xylene; and a halogenated hydrocarbon of from 1 to 10 carbon atoms, e.g., ethylene dichloride and tetrachloroethylene.

EXAMPLE II

Reaction II

A solution of 10.0 g. (0.058 mole) of cis-4-cyclooctene-1-carboxylic acid chloride in 15 ml. of ethylene dichloride (a percent by weight concentration of starting material in the solvent of 54%) was heated at reflux (83°–84° C.) for 72 hours under a nitrogen atmosphere. The warm reaction mixture was poured into 100 ml. of warm water (50°–90° C.) and allowed to stand for one hour. The mixture was cooled to 27° C. and extracted with three 35 ml. portions of ether. The etheral layers were combined, washed with water, dried and evaporated to give 8.0 g. of a light brown liquid. Gas chromatographic analysis showed the presence in this liquid of II (65%), III (24%) and I (7%).

The reaction mixture (8.0 g.) prepared above was added to 10.0 g. of potassium tertiary-butyl alcoholate in 100 ml. of tertiary-butyl alcohol and the mixture thus obtained was stored under nitrogen at 25° C. for 16 hours. 100 ml. of water was added and the mixture extracted with three 100 ml. portions of petroleum ether. The etheral extracts were combined, washed with water, dried and evaporated to give 3.0 g. (31% yield) of exo-2-chlorobicyclo[3.3.1]nonan-9-one II. Recrystallization from acetone gave the product as long colorless needles, M.P. 70°–72° C., having an ordor described as a grassy-weedy camphoraceous note with a musty-woody background.

Identification of the product was confirmed by n.m.r. and infrared spectral properties.

*Analysis.*—Calcd. for $C_9H_{13}OCl$ (percent): C, 62.6; H, 7.6; Cl, 20.5. Found (percent): C, 63.2; H, 7.6; Cl, 20.3.

In this example, substantially equivalent results are obtained in that II is formed as the dominant product when the ethylene dichloride is replaced by any of the solvents specified above under Example I.

EXAMPLE III

Reaction III

A solution of 10.9 g. (0.058 mole) of cis-4-cyclooctene-1-carboxylic acid chloride and 0.050 g. (0.00038 mole) of aluminum chloride in 30 ml. of diethylene glycol dimethyl ether[3] was heated under a nitrogen atmosphere at 100° C. for 16 hours. The reaction mixture was then cooled to 25° C. 100 ml. of water was added dropwise to the reaction mixture to destroy the aluminum chloride. The resulting mixture was stirred for 1 hour and extracted with three 100 ml. portions of ether. The etheral layers were combined, washed with water, dried and evaporated to give 8.5 g. of a dark brown liquid. The brown liquid was distilled (90°–105° C., 0.1 mm.) to give 6.0 g. of a colorless liquid. Chromatographic analysis of this liquid showed the presence of I (30%), II (13%), and III (33%). 2-endo-chloro-bicyclo[3.3.1]nonan-9-one III (21% yield) was collected by preparative gas-liquid chromatography as colorless needles, M.P. 65°–66.5° C., having an odor described as a grassy-weedy camphoraceous note with a musty-woody background.

Identification of the product was confirmed by n.m.r. and infrared spectral properties.

*Analysis.*—Calcd. for $C_9H_{13}OCl$ (percent): C, 62.6; H, 7.6; Cl, 20.5. Found (percent): C, 62.7; H, 7.9; Cl, 19.8.

In this example, substantially equivalent results are obtained in that III is formed as the dominant product when the diethylene glycol dimethyl ether is replaced by any of the solvents specified above under Example I.

EXAMPLE IV

Perfume compositions

A perfume composition is prepared by intermixing the components shown below.

| Component: | Percent by weight |
|---|---|
| Bergamot | 22 |
| Lavender | 30 |
| Sandalwood E. I. | 15 |
| Patchouli | 6 |
| Labdanum resin | 4 |
| Musk ambrette | 4 |
| Rosemary | 15 |
| 2-exo-chlorobicyclo[3.3.1]nonan-9-one | 1 |
| 2-endo-chlorobicyclo[3.3.1]nonan-9-one | 1 |
| Bicyclo[3.3.1]non-2-en-9-one | 2 |

This perfume composition exhibits a highly desirable and useful woody-lavender odor. As discussed hereinbefore, the compounds prepared by the novel reaction of this invention are useful in various perfume compositions. Thus, the components and proportions in the perfume composition of this example can be adjusted according to methods known in the perfume art to form a wide variety of desirable perfume compositions containing odoriferously effective amounts of 2-exochlorobicyclo[3.3.1]nonan-9-one, 2-endo-chlorobicyclo[3.3.1]nonan-9-one, bicyclo[3.3.1]non-2-en-9-one, and mixture thereof.

EXAMPLE V

Detergent compositions

A conventional heavy-duty built detergent having the following composition is prepared.

| Component: | Percent by wt. |
|---|---|
| Sodium dodecyl benzene sulfonate | 20.0 |
| Sodium tripolyphosphate | 50.0 |
| Sodium silicate | 6.0 |
| Sodium sulfate | 14.0 |
| Water | 9.8 |
| Perfume composition of Example IV | 0.2 |

This detergent composition exhibits a highly desirable woody-lavender odor. Other perfume compositions employing odoriferously effective amounts of 2-exo-chlorobicyclo[3.3.1]nonan-9-one, 2-endo - chlorobicyclo[2.2.1]nonan-9-one, and mixtures thereof, can be substituted on a weight basis for the perfume composition in the detergent composition of this example according to methods well known in the perfume art.

EXAMPLE VI

Detergent bar compositions

A conventional household detergent bar having the following composition is prepared.

---

[3] This represents a percent by weight concentration in the solvent of 35% and 1.75% respectively for cis-4-cyclooctene-1-carboxylic acid chloride and aluminum chloride.

| Component: | Percent by wt. |
|---|---|
| Sodium soap | 75.0 |
| Potassium soap | 7.5 |
| (The total soap comprises a mixture of 80% tallow soap and 20% coconut soap.) | |
| Water | 15.0 |
| Perfume composition of Example IV | 2.5 |

This detergent bar composition exhibits a highly desirable woody-lavender odor. Other perfume compositions employing odoriferously effective amounts of 2-exo-chlorobicyclo[3.3.1]nonan-9-one, 2-endo-chlorobicyclo[3.3.1]nonan-9-one, and mixtures thereof, can be substituted on a weight basis for the perfume composition in the detergent bar composition of this example according to methods well known in the perfume art.

EXAMPLE VII

Flavor compositions

A blue cheese flavor formulation was prepared by intermixing the following ingredients.

| Ingredient: | Drops |
|---|---|
| Diacetyl | 30 |
| Butyric acid | 5 |
| Caprylic acid | 2 |
| Acetyl butyryl | 3 |

This composition had a desirable blue cheese flavor. However, when 0.01 grams of 2-exo-chlorobicyclo[3.3.1]nonan-9-one was added, there was a general enhancement of the fullness and cheese-flavor character. Substantially identical results are obtained when 2-endo-chlorobicyclo[3.3.1]nonan-9-one is substituted for 2-exo-chlorobicyclo[3.3.1]nonan-9-one.

What is claimed is:

1. The intramolecular cyclization process, which comprises:
heating cis-4-cyclooctene-1-carboxylic acid chloride at a temperature of 30° C. to the boiling point of the solvent in the presence of an inert solvent to form bicyclo[3.3.1]non-2-en-9-one, 2 - exo - chlorobicycle [3.3.1]nonan-9-one, and 2-endo-chlorobicyclo[3.3.1]nonan-9-one.

2. The process of claim 1 wherein a low concentration of cis-4-cyclooctene-1-carboxylic acid chloride in the solvent is heated at a temperature of from about 70° C. to about 110° C. in the presence of a Lewis acid catalyst, and the bicyclo[3.3.1]non-2-en-9-one product is separated from the reaction medium.

3. The process of claim 2 wherein the solvent is a polar solvent and the concentration of cis-4-cyclooctene-1-carboxylic acid chloride in said solvent is within the range of from about 0.1% to about 20% by weight.

4. The process of claim 2 wherein the Lewis acid catalyst is selected from the group consisting of boron trifluoride, aluminum chloride, ferric chloride, stannic chloride, and stannous chloride.

5. The process of claim 1 wherein a high concentration of cis-4-cyclooctene-1-carboxylic acid chloride in a solvent is heated at a temperature of from about 70° C. to about 110° C., and the 2-exo-chlorobicyclo[3.3.1]nonan-9-one product is separated from the reaction mixture.

6. The process of claim 5 wherein the solvent is a non-polar solvent and the concentration of cis-4-cyclooctene-1-carboxylic acid chloride in said solvent is within the range of from about 30% to about 90% by weight.

7. The process of claim 1 wherein a moderate concentration of cis-4-cyclooctene-1-carboxylic acid chloride in the solvent is heated at a temperature of from about 70° C. to about 110° C. in the presence of aluminum chloride, and the 2-endo-chlorobicyclo[3.3.1]nonan-9-one product is separated from the reaction mixture.

8. The process of claim 7 wherein the solvent is a polar solvent and the concentration of cis-4-cyclooctene-1-carboxylic acid chloride in said solvent is within the range of from about 0.1% to about 20% by weight.

9. A novel compound selected from the group consisting of 2-exo-chlorobicyclo[3.3.1]nonan-9-one and 2-endo-chlorobicyclo[3.3.1]nonan-9-one.

References Cited

Angew. Chem. Int. Ed., vol. 3(8), p. 583 (1964).

LEON ZITVER, Primary Examiner

N. P. MORGENSTERN, Assistant Examiner

U.S. Cl. X.R.

99—117, 140; 252—108, 161, 522